United States Patent [19]

Vande Kieft

[11] 4,201,802

[45] May 6, 1980

[54] PROCESS FOR MANUFACTURING PREFINISHED HARDBOARD

[75] Inventor: Joseph A. Vande Kieft, Progress, Oreg.

[73] Assignee: SCM Corporation, New York, N.Y.

[21] Appl. No.: 898,967

[22] Filed: Apr. 21, 1978

[51] Int. Cl.$^2$ .............................................. B32B 31/00
[52] U.S. Cl. ...................... 427/370; 156/278; 260/23 R; 260/29.6 BM; 260/29.6 B; 427/393; 428/511; 264/109; 264/113; 264/119; 264/126; 525/56
[58] Field of Search ............... 156/327, 278; 427/393, 427/370; 428/511; 526/7; 260/23 R, 29.6 B, 29.6 BM; 264/109, 113, 119, 126

[56] References Cited

U.S. PATENT DOCUMENTS

| | | | |
|---|---|---|---|
| 1,875,055 | 8/1932 | Loetscher | 156/278 |
| 2,277,259 | 3/1942 | Schnabel et al. | 260/23 R |
| 2,306,790 | 12/1942 | Meigs | 260/23 R |
| 2,819,983 | 1/1958 | Salo et al. | 428/511 |
| 3,597,262 | 8/1971 | Bader et al. | 427/393 |

Primary Examiner—John T. Goolkasian
Assistant Examiner—J. J. Gallagher
Attorney, Agent, or Firm—Thomas M. Schmitz

[57] ABSTRACT

A process for manufacturing prefinished hardboard includes the use of a pre-press sealer comprising an aqueous mixture of a polyvinyl alcohol polymer in conjunction with emulsified fatty acid and/or fatty esters, an amine or similar emulsifier, and aluminum stearate. The pre-press sealer provides excellent sealing and hardening fiber binding to the porous fiberboard surface as well as improving the release from the press after the fiberboard is formed in a press under heat and pressure.

1 Claim, No Drawings

PROCESS FOR MANUFACTURING PREFINISHED HARDBOARD

BACKGROUND OF THE INVENTION

This invention relates to an improved process for manufacturing prefinished hardboard such as fiberboard, particleboard, and other board fabricated from fibers or chips consolidated under pressure and heat to form an integral board material. Flat panel boards of ¼-, ½-, ¾-inch or larger thicknesses can be produced in varying board sizes such as 4 feet by 8 feet which is typical for use in the construction industry. Other particularly formed objects can be produced by hot pressing fibrous materials in proper matched die presses such as toilet seats and automobile dashboards. Important features in the hardboard manufacturing process include surface sealing of the hardboard product and obtaining a clean release of the pressed hardboard from the hot press mold. U.S. Pat. No. 2,635,976 suggests a binder composition based on phenol-formaldehyde resin and butadiene-styrene latex for binding together the loose fibers and/or chips into an integral composite finished part. More recently issued U.S. Pat. No. 4,009,073 suggests a multi-step process for producing a hardboard as well as disclosing various wet processes and dry processes for manufacturing hardboard, and particularly discloses a process for utilizing so-called "white water". White water is recycled used water previously used in pulp operations and/or used in hardboard processes and often contains considerable impurities such as wood sugars and some lignocellulose fibers. Due to the numerous resinous and lignocellulose materials present in the fibers and chips used in hardboards, sticking to the hot mold is quite a common problem even if a mold release agent is used for coating the mold surface. A further problem in hardboard production is often experienced in the end product wherein the hardboard product surface is subsequently finished in a subsequent process. The hardboard surface must further exhibit excellent holdout to decorative paint coating or patterns so as to avoid uneven or excessive absorption of the paint into the fiberboard surface.

It now has been found that the hardboard process and the hardboard product can be substantially improved by utilizing a pre-press sealer containing a polymer of polyvinyl alcohol in combination with a volatile amine, emulsified fatty acid or esters, and aluminum stearate. The pre-press sealer is applied to the surface of the fiberboard composite prior to inserting the composite hardboard preform into the hot press. The sealer is integrally cured into the fiberboard surface during the hot-pressing step. The resulting sealed fiberboard product produced in accordance with this invention exhibits substantially improved surfaces as well as eliminates sticking of the fiberboard to the press surface. These and other advantages are achieved by the process of this invention.

SUMMARY OF THE INVENTION

Briefly, this invention is directed to the use of an aqueous pre-press sealer comprising a polyvinyl alcohol polymer together with emulsified fatty acids or esters, a volatile amine, and aluminum, zinc, or calcium stearates as well as driers or catalysts if desired. The aqueous pre-press sealer is preferably applied to the surface mat or top surface of the fiberboard composite prior to the step of hot-pressing. The sealer is cured during the hot-press step thereby providing a sealer surface coating on the pre-finished hardboard product.

DETAILS OF THE INVENTION

The process of this invention utilizes an aqueous pre-press sealer applied to the surface of the hardboard and cured during the hot-pressing step. The heat curable pre-press sealer is an aqueous mixture comprising by weight about 10% and 50% of a water solution of polyvinyl alcohol (10%), 10% and 25% fatty acid or fatty ester, 1% and 5% volatile amine, 5% and 10% aluminum stearate, and at least 15% water.

Referring first to the polyvinyl alcohol polymer, the polymer is preferably a homopolymer of vinyl alcohol monomer copolymerized to provide a polymer although a copolymer can be used containing very minor amounts up to about 5% of other ethylenically unsaturated monomers containing carbon-to-carbon double bond unsaturation. The polyvinyl alcohol is partially hydrolyzed; preferably 85% to 90% hydrolyzed to provide water dispersion, higher solution solids, and film flexibility. Higher molecular weight and larger particle size polymer particles are preferred and are believed to provide surface hold or less absorption into the fibrous hardboard mat prior to and during the hot-pressing step. The polyvinyl alcohol is believed to be reactive with the unsaturated fatty acid during the hot-pressing process. The pre-press sealer can contain between about 1% and 5% polyvinyl alcohol on a dry solids volume basis.

The pre-press sealer of this invention further contains by weight between about 1% and 10% volatile amine soap or similar emulsifier based on film-forming solid material. Suitable volatile amines are water-dispersible amines selected from morpholine, monoethanolamine, methylethanol amine, and ammonia. The volatile amine is added to interact with the fatty acid and impart water dispersion properties to the overall composition whereby the fatty acid is rendered water soluble by the volatile amine. The amine volatilizes during the hot-pressing step.

The pre-press sealer of this invention further contains about 10% and 80% fatty acid or fatty esters based upon the film-forming solids. The fatty acid and/or ester is unsaturated, having an iodine number above 100, and preferably above 130, and derived from a drying or semi-drying vegetable oil. Typical fatty materials contain two or more double bonds such as linoleic, linolenic, eleostearic acids or single double bond fatty acids such as oleic, docosenoic, or other similar unsaturated fatty acids having 12 to 22 carbon atoms and containing at least one double bond and preferably two conjugated double bonds in the hydrocarbon chain. The fatty acid is believed to interact with the polyvinyl alcohol during the hot-pressing step.

The pre-press sealer further contains between about 5% and 10% by weight of aluminum stearate or other metal stearate which advantageously provides adhesion properties to the sealer for susequent paint coatings. Other useful stearates include calcium and zinc stearates. Aluminum stearate is preferred and is believed to provide release properties and water resistance properties as well as provide a lattice structure within the cured film-forming material during the in-press hot-pressing process.

The pre-press sealer can contain cellulosic stabilizers such as hydroxyethyl cellulose, gum tragacth, algin gums, carboxymethyl cellulose. Nonionic, cationic, and anionic surfactants can be added as dispersing assistants for aqueous solutions. Driers can be added such as cobalt or manganese driers.

The sealer can further contain fillers and/or pigments provided the same are not basic or basic reactive in water. Pigments such as amorphous silica provide a filling action to the sealing properties of the sealer. Pigments can include opacifying pigment such as titanium dioxide or extender pigments such as silica, talc, mica, nonalkaline clays, iron oxides, carbon black, lampblack, graphite and similar pigments. For hardboards to be subsequently painted by electrostatic or similar electrical application, the sealer can contain sufficient electrically conductive carbon black, graphite, metal powder or conductive resin to provide sufficient conductivity to the electrical applied finish paint coating.

In practicing this invention, sheet hardboard such as 4 foot by 16 foot panels or other specifically formed articles are fabricated into a preform composite to be hot-pressed under heat and pressure to form the pre-finished hardboard product. Quite often, the composite pre-form includes a surface mat for imparting a more uniform surface on the final hardboard product. Prior to hot-pressing, the pre-press sealer is applied preferably to the surfaces of the composite preform although the pre-press sealer can be applied to the die surfaces of the hot press or the matched dies. The pre-press sealer can be applied to ether the composite preform or the matched die surfaces by conventional application means such as air or airless spray, curtain coating, roller coating, or brushing and ordinarily applied at the level of about 1 to 4 grams or more of sealer film-forming solids per square foot of surface area of hardboard product. Advantages of this process and the sealer composition include sprayability, low viscosity at high solids, and a soft residue after air drying as well as eliminating clogging of spray tip which often occurs in latex type compositions.

The following examples illustrate the merits of this invention. In all instances the parting of the finished hardboard object form the die or caul plate was substantially perfect. In this specification all parts are parts by weight, and all percentages are weight percentages unless otherwise expressly noted.

EXAMPLE 1

A typical mat hot-pressing process was utilized to produce preform composites of hardboard stock about ⅜-inch thick and containing about 6–9% moisture. The hardboard stock was then conveyed into an airless spray coating zone wherein the stable aqueous pre-press sealer dispersion made with agitation as indicated herein below, was sprayed on the mats to provide 2½ grams per square foot of final (dry) coating solids:

| Ingredients in Order of Mixing | Gallons | Pounds | % by Weight |
|---|---|---|---|
| water | 4.86 | 40.45 | 5 |
| 9.5% aqueous solution of polyvinyl alcohol, about 90% hydrolized, molecular weight about 125,000, containing about 20% residual polyvinyl acetate | 9.55 | 80.90 | 10 |
| ammonium hydroxide (30% NH3) | 1.45 | 12.14 | 1.5 |
| defoamer | 1.06 | 8.09 | 1 |
| aluminum di-stearate, melting point 145° C. | 4.81 | 40.45 | 5 |

| Ingredients in Order of Mixing | Gallons | Pounds | % by Weight |
|---|---|---|---|
| The foregoing are mixed and ground in a Cowles mixer. | | | |
| 9.5% aqueous solution of polyvinyl alcohol, about 90% hydrolized, molecular weight about 125,000, containing about 20% residual polyvinyl acetate | 19.09 | 161.81 | 20 |
| morpholine, distillation range 177°–183° F. | 7.41 | 48.54 | 6 |
| distilled tall oil fatty acid, Acid No. 193, Iodine No. 130 | 17.24 | 129.44 | 16 |
| cobalt drier (6%) | 0.63 | 4.85 | 0.6 |
| water | 33.90 | 282.35 | 34.9 |
| | 100 | 809.0 | 100% |

The sealer coated mats were positioned between an upper caul plate patterned to impart a wood grain texture to the surface of the mat, and a smooth bottom plate. (The primer also can be applied to the mat just after the predrier and before the pressing). The caul plates of the hot-press were heated with coils of superheated steam to a temperature of 350° F. although temperatures between about 300°0 F. to 450° F. are suitable. The press applies an average pressure of about 100–600 psi (range of 100 to 1,200 psi) for 2 to 14 minutes, then is opend. Freshs mats are charged to the opened press, and these push out the freshly pressed hardboard pieces. The hardboard has high paint hold-out, no fuzzy high points, good pattern fidelity, and a comparatively smooth surface between contour ridges. This board can be topcoated with conventional alkyd interior enamel having a dry film thickness of 1–2 mils to give complete opacification. Smooth hardboard can also be made using the above procedure, but without the surface texturing step.

A sample of the thus-toned hardboard was subjected to Weatherometer testing (ASTM D822, p. 126, part 27, Standard recommended Practice ASTM, 1974). A comparable test sample of the same kind of board was made in essentially the same manner but without the sealer. After 1500 hours exposure, the pre-press sealed boards in accordance with this invention show no checking, cracking, or other signs of coating failure. The boards without sealer show signs of checking and cracking, both indications of poorer adhesion of primer to substrate. These results hold true for water reducible primers as well.

EXAMPLE 2

Similar to Example 1, the following ingredients were mixed in the order indicated:

| Ingredients in Order of Mixing | Gallons | Pounds | % by Weight |
|---|---|---|---|
| distilled tall oil fatty acid, Acid No. 193, Iodine No. 130 | 30.37 | 228.07 | 25 |
| manganese drier (6%) | 0.7 | 5.47 | 0.6 |
| non-silicone defoamer | 1.20 | 9.12 | 1.0 |
| alkyl-aryl-polyethoxyethanol, non-ionic surfactant | 4.12 | 36.49 | 4 |
| aluminum di-stearate, melting point 145° C., 14% free stearic acid | 8.03 | 67.51 | 7.4 |
| micronized amorphous silica 1-2 microns, 100% passes 325 mesh | 8.27 | 182.45 | 20 |
| ammonium hydroxide (29.4% NH3 by weight) | 1.21 | 9.12 | 1 |
| The foregoing are ground together | | | |

| Ingredients in Order of Mixing | Gallons | Pounds | % by Weight |
|---|---|---|---|
| -continued | | | |
| at high speed in a Cowels mixer. | | | |
| 9.5% aqueous polyvinyl alcohol, 90 hydrolyzed, molecular weight 125,000, 20% residual polyvinyl acetate | 16.15 | 136.84 | 15 |
| morpholine, distillation range 177°–183° F. | 6.96 | 45.61 | 5 |
| water | 23.0 | 191.58 | 21 |
| | 100 | 912.3 | 100 |

The above sealer composition was tested as a pre-press sealer with the following results. On both wet and dry processes of hardboard manufacture, this product increased sealing of the surface, water resistance, plate release and paint hold-out substantially. Adhesion of both water reducible and alkyd-type primers to the hardboard was improved, as noted by Weatherometer tests (as in Example 1) and cross-hatch adhesion tests following a 24 hr. water soak. Tests and results are similar to Examples 1 and 2, but this product (above) is more economical due to higher solids, and reduces to a low viscosity for spraying with less dilution, allowing for adequate solids at high line speeds.

The above examples are only typical and are not to be construed to mean they are the only processes that will work. Typically, any fiberous mat (glass, wood or otherwise), board, plywood, etc. can be used as the substrate to which the pre-press sealer of the invention can be applied and used in a hot press manufacturing process to obtain desired result such as improved texture fidelity, better subsequent paint holdout, greater surface strength or integrity, etc.

The pre-press sealer of this invention provides good mold release as well as particularly imparting excellent surface sealing properties. The pre-press sealer of this invention substantially improves water resistance and avoids cracking or fiber swelling in the prefinished hardboard product.

I claim:

1. In a process for molding prefinished fiberboard products under heat and pressure comprising:
   providing a plurality of layers of fiberboard stock material in the form of a non-consolidated preformed fiberboard product;
   coating the surface of said preformed fiberboard with an aqueous pre-press sealer being resinous material dispersed in water and comprising by weight on a film-forming solids basis between about 30% and 50% of a copolymer containing by weight at least 95% copolymerized vinyl alcohol, 10% and 25% emulsified fatty acid and/or fatty acid ester, 1% and 5% volatile amine emulsifier and 5% and 10 % aluminate stearate, and at least about 15% water;
   hot pressing said preformed fiberboard containing surface sealer at temperatures of at least about 100° C. within a press for time sufficient to consolidate said preformed fiberboard into a solid fiberboard product having a sealed top surface; and
   releasing said sealed fiberboard product from the press surface without sticking of the fiberboard product surface to the press surface.

* * * * *